United States Patent
Tschudin

(10) Patent No.: US 7,641,713 B2
(45) Date of Patent: Jan. 5, 2010

(54) METHOD FOR REDUCING CR IN METALLURGICAL SLAGS CONTAINING CR

(75) Inventor: Markus Tschudin, Basel (CH)

(73) Assignee: Holcim Technology Ltd., Jona (CH)

( * ) Notice: Subject to any disclaimer, the term of this patent is extended or adjusted under 35 U.S.C. 154(b) by 621 days.

(21) Appl. No.: 11/579,102

(22) PCT Filed: May 18, 2005

(86) PCT No.: PCT/IB2005/001342

§ 371 (c)(1),
(2), (4) Date: Oct. 27, 2006

(87) PCT Pub. No.: WO2005/113840

PCT Pub. Date: Dec. 1, 2005

(65) Prior Publication Data

US 2007/0227307 A1    Oct. 4, 2007

(30) Foreign Application Priority Data

May 18, 2004    (AT) .............................. GM 367/2004

(51) Int. Cl.
*C22B 7/04*    (2006.01)
*C21C 5/28*    (2006.01)

(52) U.S. Cl. .............................. 75/561; 75/532; 75/623
(58) Field of Classification Search .................. 75/531, 75/532, 560, 561, 623
See application file for complete search history.

(56) References Cited

U.S. PATENT DOCUMENTS

| | | | |
|---|---|---|---|
| 5,743,938 A * | 4/1998 | Nishikawa et al. ............ | 75/532 |
| 5,882,375 A * | 3/1999 | Edlinger et al. ............ | 75/10.35 |
| 6,332,910 B1 | 12/2001 | Edlinger | |
| 6,395,054 B1 | 5/2002 | Edlinger | |
| 6,409,793 B1 | 6/2002 | Edlinger | |
| 6,679,931 B1 * | 1/2004 | Gotzinger et al. ........... | 75/10.35 |
| 6,843,828 B2 * | 1/2005 | Edlinger ....................... | 75/500 |
| 6,855,189 B2 * | 2/2005 | Edlinger ....................... | 75/623 |

FOREIGN PATENT DOCUMENTS

| EP | 1 094 043 A1 | 4/2001 |
|---|---|---|
| WO | WO 01/55459 A1 | 8/2001 |
| WO | WO 01/55461 A1 | 8/2001 |

* cited by examiner

*Primary Examiner*—George Wyszomierski
*Assistant Examiner*—Mark L Shevin
(74) *Attorney, Agent, or Firm*—Chapman and Cutler LLP

(57) ABSTRACT

A method for reducing the chromium content from a metallurgical slag, in which the slag is charged onto an iron bath in the liquid state and the reduction of Cr is effected by the iron bath having a C content of 2 to 4% by weight, wherein a) the Cr-containing slag having a Cr content of 2 to 20% by weight is charged onto an iron bath having a C content of below 1% by weight, whereupon
b) the carbon content of the iron bath is raised to about 2 to 4% by weight by the addition of carbon carriers at the simultaneous supply of energy,
c) the liquid slag having a Cr content of about 0.1% by weight is tapped after the reduction of Cr,
d) a cooling agent, preferably scrap, is added to the iron melt and the C content of the melt is lowered to below 1% by weight, and
e) a portion of the Cr-containing melt is tapped in the liquid state, while the remaining portion is left in the converter in the liquid state for the treatment of the subsequent melt.

2 Claims, No Drawings

METHOD FOR REDUCING CR IN METALLURGICAL SLAGS CONTAINING CR

The invention relates to a method for reducing the chromium content from a metallurgical slag, in which the slag is charged onto an iron bath in the liquid state and the reduction of Cr is effected by the iron bath having a C content of 2 to 4% by weight.

During the production of stainless steels, considerable amounts of slag occur, whose content of Cr is so high that a reduction will be suitable from an economical point of view. But also for reasons of environmental protection, the reduction of the Cr contents of such slag is desirable in the long run.

WO 01/055461 A1, for instance, describes a method in which the Cr content of a slag is reduced to about 0.05 to 0.2% by weight by reaction with a C-containing iron bath.

However, the practical realization of that method involves considerable difficulties, which are probably the cause why that method has not been applied so far.

As indicated in the above-mentioned patent application, a C-content of the iron bath amounting to at least 3% is necessary for such reduction. The Cr content of the slag ranges from 4 to 6% by weight.

The liquid Cr-containing slag is to be charged on a pig iron bath. Pig iron is meant to denote iron having a C content of about 4% by weight.

Another disadvantage of the above-mentioned invention resides in that the chromium reduced from the slag is contained a pre-alloy having a high C content. That C content would have to be refined out again in the electric furnace, which would adversely affect the overall process.

In the patent application WO 01/055459 A1 it is already pointed out that liquid slag having an FeO content of more than 5% by weight will trigger vigorous reactions when charged on a pig iron bath. It is, therefore, required to reduce the C content of the iron bath to below 0.5% by weight prior to charging said liquid FeO-containing slag. However, similar reactions will also occur if CrO-containing slags having chromium oxide contents of more than 2% by weight are charged onto an iron bath having an elevated C content.

The present invention avoids the disadvantages of the methods described. The reduction of Cr from metallurgical slags according to the invention is effected by the combination of the following method steps:

a) the Cr-containing slag having a Cr content of 2 to 20% by weight is charged onto an iron bath having a C content of below 1% by weight, whereupon b) the carbon content of the iron bath is raised to about 2 to 4% by weight by the addition of carbon carriers at the simultaneous supply of energy, c) the liquid slag having a Cr content of about 0.1% by weight is tapped after the reduction of Cr, d) a cooling agent, preferably scrap, is added to the iron melt and the C content of the melt is lowered to below 1% by weight; preferably to below 0.5% by weight, and e) a portion of the Cr-containing melt is tapped in the liquid state, while the remaining portion is left in the converter in the liquid state for the treatment of the subsequent melt.

A bottom-blowing converter in which the reaction gases are afterburned by a hot-air jet is particularly suitable for carrying out the method according to the invention. It is only due to the high efficiency caused by the supply of energy in this method, that the required amount of coal is so low as to enable the method to be operated in an economical manner.

For the method according to the invention, it is essential that the slag is separated from the iron bath at a high C content after the reduction of the Cr content. Only a small amount of residual slag will, thus, remain in the converter, which will again increase in terms of Cr content during the subsequent lowering of the C content in the iron bath. The thus slagged amount of Cr, however, is so small that it will hardly have any effect on the Cr balance. Besides, that slag remains in the converter and the Cr content will then be reduced anew in the subsequent charge.

Unalloyed scrap as is usually employed at a portion of 30% by weight in the production of stainless steel grades may, for instance, be used as a cooling means during iron melt refining. Unalloyed scrap in this case offers the advantage of the Cr content of the iron melt remaining low, which will result in shorter treatment times for the reduction of the slag. Yet, also residues from recyclings occurring during the processing of wastes, or even slags derived from AOD converters or ladle degassing plants, may be melted down therewith.

The method according to the invention offers the following advantages over the prior art:

The iron bath required for treating the Cr-containing slag is recovered from the preceding melt.

The pre-alloy formed in the converter by the reduction of the Cr-containing slag has a low C content and may be added into the electric furnace in the liquid state.

The unalloyed scrap is melted down in a cost-effective manner, thus accordingly increasing the productivity of the electric furnace.

The method according to the invention will be explained in more detail by way of an example:

Steel grades having a Cr content of 18% by weight and an Ni content of 8% by weight are produced in a 100-ton electric furnace. The production according to the prior art comprises the meltdown of 60 tons of alloyed scrap, 35 tons of unalloyed scrap and 15 tons of FeCr in an electric furnace. After the reduction of the slag by the aid of ferrosilicon, 100 tons of liquid steel containing 18% by weight of Cr, 8% by weight of Ni and 0.5% by weight of C are tapped along with 10 tons of slag. The slag has a Cr content of 5% by weight and an FeO content of 1.5% by weight.

In accordance with the invention, this slag is charged in the liquid state into a converter containing 20 tons of an iron melt that includes 0.5% by weight of C, and 3% by weight of Cr, from the preceding melt.

The converter is operated at a blowing rate of 5,000 Nm/hr for the oxygen introduced through its bottom, and at a hot-air top-blowing rate of 25,000 Nm/hr, said hot air being enriched to 25% by weight of $O_2$. In total, 5 tons of dusty coal are supplied by blowing in through bottom tuyeres.

For the first partial step, namely the increase in the C content and the temperature of the iron bath as well as the reduction of chromium from the slag, 2 tons of coal are required. It is suitable to simultaneously melt down, in said first partial step, also the amounts of slag and alloyed scrap occurring in the processing of wastes, which amount to about 4% by weight of the amount of steel produced. To this end, about 0.5 ton of coal is required. After this, the slag, whose Cr content amounts to about 0.1% by weight, is tapped. If necessary, the Cr content may be reduced to about 0.01% by weight prior to slagging by the addition of 4 kg FeSi/ton of slag.

Thirty tons of unalloyed scrap are charged into the iron bath, which has a C content of 3% and a Cr content of 7% by weight. To melt down said scrap, 3 tons of coal are required, 2.5 tons of which are blown in as dust, while the remaining quantity is supplied by the iron bath, whose C content is lowered from 3% by weight to 0.5% by weight during smelting.

From the pre-alloy present in the converter and containing 3% by weight of Cr, 30 tons are tapped and charged into the electric furnace in the liquid state. The remaining quantity of 20 tons is left in the converter for the subsequent charge.

The above-mentioned amounts may be varied within wide limits. Thus, it is, for instance, feasible to reduce the additionally smelted scrap amount to about 15 tons. A pre-alloy containing 7% by weight of Cr will thus be formed for use in the electric furnace. This will, however, entail a considerable increase in the Cr content of the iron bath, which will cause an extension of the time required to reduce Cr from the slag. The process is to be controlled in a manner that the Cr content of the iron bath will not exceed 10% by weight in the individual partial steps.

The present invention is also aimed to change the composition of slags, by the addition of appropriate slag-forming materials, in a manner that such slags can be employed in the production of cement.

The invention claimed is:

1. A method for reducing the chromium content in a metallurgical slag, in which the slag is charged in a liquid state onto an iron bath in a converter, comprising the steps of:
   a) charging a Cr-containing slag in a liquid state having a Cr content of 2 to 20% by weight onto an iron bath having a C content of below 1% by weight,
   b) raising the C content of the iron bath to about 2 to 4% by weight by adding carbon carriers and supplying energy,
   c) tapping the liquid slag, having a Cr content of about 0.1% by weight after reduction of the Cr,
   d) adding a cooling agent to the iron bath and lowering the C content of the iron bath to below 1% by weight, and
   e) tapping a portion of the Cr-containing slag in the liquid state, leaving a remaining portion of the Cr-containing slag in the liquid state in the converter for treatment of a subsequent melt.

2. A method according to claim 1, wherein, in step (d), the C content of the iron bath is lowered to below 0.5% by weight.

* * * * *